June 26, 1928.

W. H. TSCHANTZ 1,675,067

MEAT GRINDER

Filed June 3, 1926

Inventor

W. H. Tschantz

By Frease and Bond

Attorneys

Patented June 26, 1928.

1,675,067

UNITED STATES PATENT OFFICE.

WILLIAM H. TSCHANTZ, OF CANTON, OHIO, ASSIGNOR TO THE W. H. TSCHANTZ & SONS CO., OF CANTON, OHIO, A CORPORATION OF OHIO.

MEAT GRINDER.

Application filed June 3, 1926. Serial No. 113,465.

The invention relates to meat grinders including a housing provided with an internal spiral, and a feed screw and cutter mounted in and upon the housing; and the objects of the invention are to provide a construction and arrangement of the internal spiral and the feed screw which shall enable more efficient and rapid grinding of meat and the like processed through the grinder.

These objects are attained in the present improvements by providing ground cutting faces and edges for the internal spiral, coacting with ground cutting faces and edges upon the rotating feed screw.

A preferred embodiment of the invention is illustrated in the accompanying drawing, forming part hereof, in which—

Figure 1:
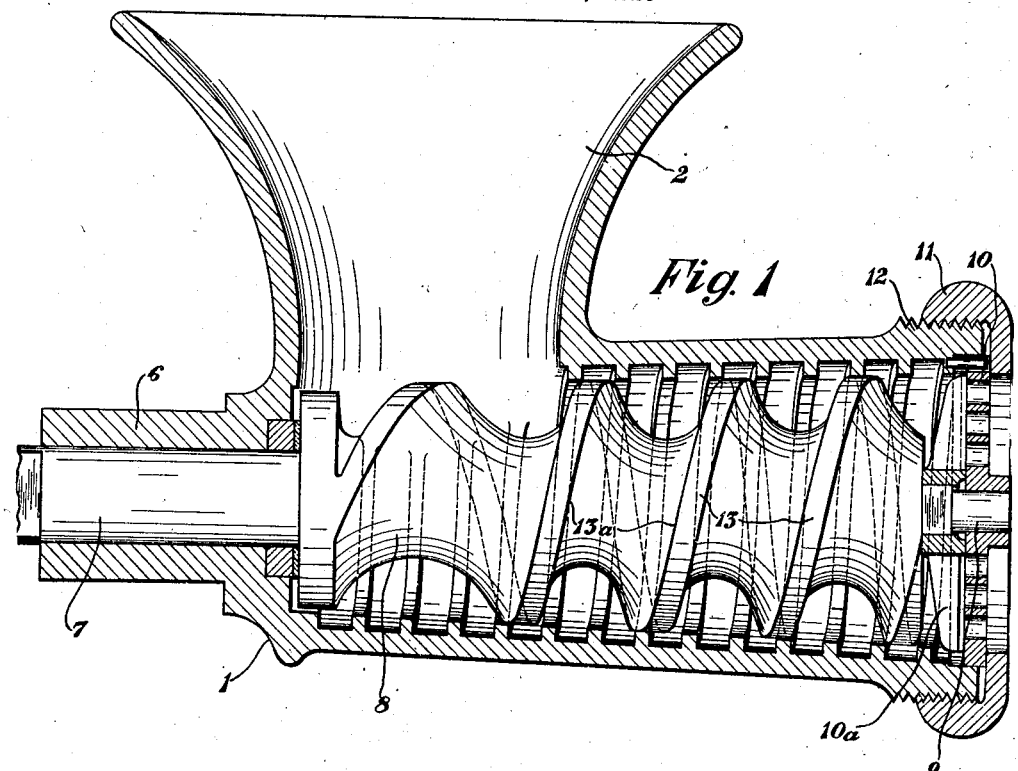
Figure 2:
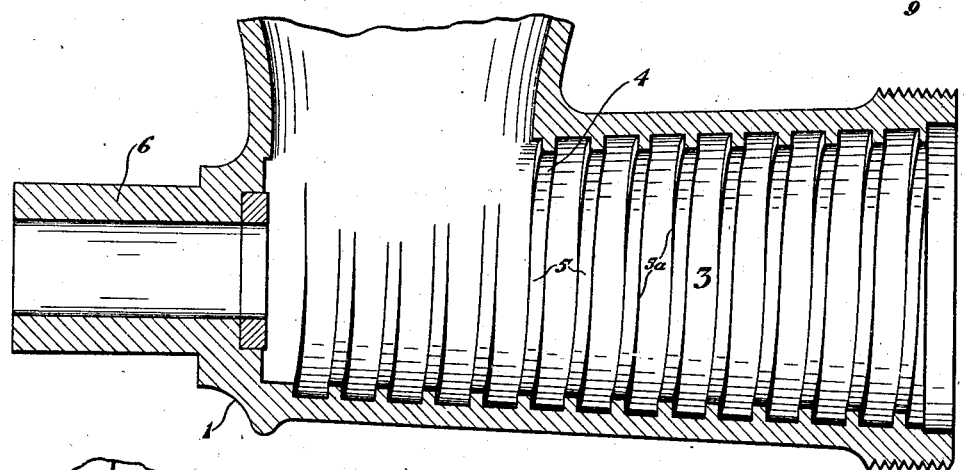
Figure 3:
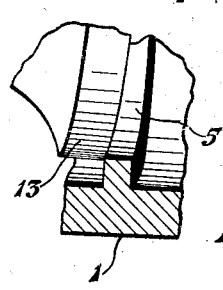

Figure 1 is a fragmentary vertical axial cross-section of the improved meat grinder;

Fig. 2, a fragmentary axial cross-section of the housing provided with an internal spiral having ground cutting faces and edges; and Fig. 3, an enlarged fragmentary view similar to Fig. 1, illustrating the action of the ground cutting faces and edges of the feed screw with the ground cutting faces and edges of the spiral.

Similar numerals refer to similar parts throughout the drawings.

The improved meat grinder includes a housing 1, having a flared inlet orifice 2 for admitting meat to be ground, and angular thereto a preferably tubular feed and grinding chamber 3 provided with a continuous internal spiral 4 having ground cutting faces 5 and edges 5ª.

Coaxial with the chamber the casing also includes an end bearing 6 in which is journaled one end 7 of a feed and cutting screw 8, the other end 9 thereof being journaled in a usual apertured cutter plate 10 against which plate the cutter blades 10ª operate.

A thrust collar 11 pinned to the cutter plate is screwed upon the casing outer end 12 for varying the pressure between the cutter plate and the cutter blades, the cutter blades being keyed upon the screw shaft.

The feed screw 8 is provided with spiral threads having ground cutting faces 13 and edges 13ª coacting with the cutting faces 5 and edges 5ª of the spiral 4, there being preferably a sliding cutting fit between the ground feed screw threads and the internal spiral of the grinding chamber.

The provision of the ground cutting faces and edges, for the spiral and the feed screw enables a substantial proportion of the meat fed through the grinder to be ground by the coaction of the spiral and feed screw faces and edges before reaching the usual apertured rotary cutter plate 10, and at the same time the torque required to twist the feed screw is materially lessened.

In meat grinders of usual design neither the spiral or the feed screw are provided with ground cutting faces or edges and there is usually a substantial clearance between the spiral and the feed screw, these parts being used to merely convey meat to the rotary cutter and compress the meat against the rotary cutter.

I claim:

1. A meat grinder and the like, including a housing, a grinding chamber in the housing, an internal spiral for the grinding chamber and an oppositely disposed feed screw operatively mounted in the grinding chamber the pitch of the feed screw being considerably greater than said internal spiral, faces of the spiral and feed screw contacting and being ground for coacting with each other to cut meat and the like processed therethrough.

2. A meat grinder and the like, including a housing, a grinding chamber in the housing, an internal spiral for the grinding chamber, and an oppositely disposed feed screw operatively mounted in the grinding chamber the pitch of the feed screw being considerably greater than said internal spiral, faces and edges of the spiral and feed screw contacting and being ground for coacting with each other to cut meat and the like processed therethrough.

3. A meat grinder and the like, including a housing, a grinding chamber in the housing, an internal spiral for the grinding chamber, and an oppositely disposed feed screw operatively mounted in the grinding chamber the pitch of the feed screw being considerably greater than said internal spiral, faces of the spiral and feed screws slidably fitting each other and being ground for coacting with each other to cut meat and the like processed therethrough.

4. A meat grinder and the like, including a housing, a grinding chamber in the housing, an internal spiral for the grinding chamber, and an oppositely disposed feed screw operatively mounted in the grinding chamber the pitch of the feed screw being considerably greater than said internal spiral, faces of the spiral and feed screw contacting and being sharpened for coacting with each other to cut meat and the like processed therethrough.

5. A meat grinder and the like, including a housing, a grinding chamber in the housing, an internal spiral for the grinding chamber, and an oppositely disposed feed screw operatively mounted in the grinding chamber the pitch of the feed screw being considerably greater than said internal spiral, faces and edges of the spiral and feed screw contacting and being sharpened for coacting with each other to cut meat and the like processed therethrough.

6. A meat grinder and the like, including a housing, a grinding chamber in the housing, an internal spiral for the grinding chamber, and an oppositely disposed feed screw operatively mounted in the grinding chamber the pitch of the feed screw being considerably greater than said internal spiral, faces and edges of the spiral and feed screw slidably fitting each other and being sharpened for coacting with each other to cut meat and the like processed therethrough.

In testimony that I claim the above, I have hereunto subscribed my name.

WILLIAM H. TSCHANTZ.